United States Patent [19]
Winter et al.

[11] Patent Number: 5,985,784
[45] Date of Patent: Nov. 16, 1999

[54] CATALYST AND PROCESS FOR THE POLYMERIZATION AND COPOLYMERIZATION OF OLEFINS

[75] Inventors: Andreas Winter, Glashütten-Taunus; Volker Dolle, Kelkheim; Walter Spaleck, Liederbach, all of Germany

[73] Assignee: Targor GmbH, Germany

[21] Appl. No.: 09/018,497

[22] Filed: Feb. 4, 1998

Related U.S. Application Data

[63] Continuation of application No. 08/567,806, Dec. 6, 1995, abandoned, and application No. 08/246,483, May 19, 1994, abandoned, which is a continuation of application No. 08/008,763, Jan. 25, 1993, abandoned.

[30] Foreign Application Priority Data

Jan. 27, 1992 [DE] Germany .............................. 42 02 163

[51] Int. Cl.$^6$ ..................................... B01J 31/00
[52] U.S. Cl. .......................... 502/113; 500/102; 500/103; 500/114; 500/115; 502/116; 502/117; 526/943
[58] Field of Search ................................... 502/102, 103, 502/113, 114, 115, 116, 117; 526/943

[56] References Cited

U.S. PATENT DOCUMENTS

| | | | |
|---|---|---|---|
| 3,709,853 | 1/1973 | Karapinka et al. | |
| 4,701,432 | 10/1987 | Welborn et al. | 502/113 |
| 4,769,510 | 9/1988 | Kaminsky et al. | 585/165 |
| 4,794,096 | 12/1988 | Ewen et al. | 502/117 |
| 4,874,734 | 10/1989 | Kioka et al. | 502/104 |
| 4,962,262 | 10/1990 | Winter et al. | 585/512 |
| 5,122,491 | 6/1992 | Kioka et al. | 502/117 |
| 5,308,816 | 5/1994 | Tsutsui et al. | 502/108 |
| 5,308,817 | 5/1994 | Reddy et al. | 502/117 |
| 5,369,196 | 11/1994 | Matsumoto et al. | 526/127 |
| 5,416,178 | 5/1995 | Winter et al. | 526/160 |
| 5,498,582 | 3/1996 | Krause et al. | 502/103 |
| 5,561,092 | 10/1996 | Ewen et al. | 502/117 |

FOREIGN PATENT DOCUMENTS

| | | |
|---|---|---|
| 50436/85 | 6/1986 | Australia . |
| 51181/90 | 3/1989 | Australia . |
| 27321/88 | 6/1989 | Australia . |
| 314 797 | 4/1988 | European Pat. Off. . |
| 185 918 | 9/1989 | European Pat. Off. . |
| 387 690 | 9/1990 | European Pat. Off. . |
| 459 264 | 5/1991 | European Pat. Off. . |
| 321 852 | 12/1991 | European Pat. Off. . |

OTHER PUBLICATIONS

Xinmin Yang et al., "Cation-like Homogeneous Olefin Polymerization Catalysts Based Upon Zirconocene Alkyls and Tris(pentafluorophenyl)borane", J. Am. Chem. Soc. 1991, 113, pp. 3623–3625. no month.

Resconi, L., et al., "Macromolecules", vol. 23, (1990), pp. 4489–4491. no month.

Chien, J.C.W., et al., J.Poly. Sci., Part A, Pol., Chem. 29 (1991) pp. 459–470. no month.

Journal of Polymer Science/Part A Polymer Chemistry, Chien et al., Metallocene–Methylaluminoxane Catalysts for Olefin Polymerization I. Trimethylaluminum as Coactivator, Oct. 1988, vol. 26, pp. 3089–3102. no month.

G. B. Hiatky et al, J. Am. Chem Soc 111, pp. 2728–2729 (1989). no month.

Sinn et al., "Ziegler–Natta Catalysis", Advances in Organometallic Chemistry, vol. 18, (1980) pp. 99–149. no month.

Ewen, J.A., et al., J.Am. Chem. Soc., vol. 109 (1987) pp. 6544–6545. no month.

*Primary Examiner*—Elizabeth D Wood
*Attorney, Agent, or Firm*—Connolly and Hutz

[57] ABSTRACT

A highly effective catalyst system for the polymerization or copolymerization of olefins comprises at least one metallocene as transition-metal compound and at least one aluminum compound of the formula II

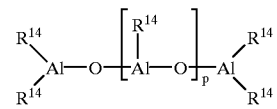

(II)

and/or of the formula (III)

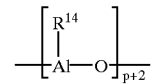

(III)

where, in the formulae (II) and (III), the radicals $R^{14}$ may be identical or different and are an alkyl group, an aryl group, benzyl or hydrogen, and p is an integer from 2 to 50, and at least one aluminum compound of the formula IV

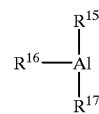

(IV)

where $R^{15}$, $R^{16}$ and $R^{17}$ are identical or different and are a hydrogen atom, an alkyl group, an alkylsilyl group, an alkoxy group, an aryl group, an aryloxy group, an alkenyl group, an arylalkyl group, an alkylaryl group, an arylalkenyl group, a halogen atom or a radical of the formula —OSiR$^{15}$R$^{16}$R$^{17}$ where $R^{15}$, $R^{16}$ and $R^{17}$ are as defined in the description.

19 Claims, No Drawings

CATALYST AND PROCESS FOR THE POLYMERIZATION AND COPOLYMERIZATION OF OLEFINS

This is a continuation of Ser. No. 08/567,806 filed Dec. 6, 1995 which is now abandoned, and is a continuation of Ser. No. 08/245,483, filed May 18, 1994 which is now abandoned, which in turn is a continuation of Ser. No. 08/008,763, filed Jan. 25, 1993 which is also abandoned.

BACKGROUND OF THE INVENTION

1. Field of Invention

The present invention relates primarily to a catalyst system for the polymerization of olefins which comprises a metallocene and at least two different aluminum compounds as cocatalyst.

2. Description or Related Art

Catalysts based on soluble metallocene compounds in combination with oligomeric aluminoxanes are known. These systems can be used to polymerize ethylene, propylene and also higher olefins (cf. EP-A 185 918; J. Am. Chem. Soc. 109 (1987) 6544).

Polyolefin waxes and polyolefins of high stereoregularity can also be prepared with the aid of metallocene/aluminoxane catalyst systems (EP-A 321 852 and EP-A 387 690).

It is common to all these processes that the cocatalyst used is an aluminoxane. This aluminum compound is expensive and difficult to prepare. In addition, relatively large amounts are required in the polymerization since the Al/metallocene ratio should be greater than 1 000, in some cases greater than 10 000, in order to achieve satisfactory metallocene activities. The residual ash content in the polymer formed is thus correspondingly high and must be removed by complex, high-cost purification steps.

There is therefore interest in reducing the amount of aluminoxane necessary or replacing the aluminoxane by other cocatalysts. However, the solutions proposed hitherto are all unsatisfactory.

Thus, replacement of all the methylaluminoxane (MAO) by twice the amount of trimethylaluminum in combination with ethylenebis(indenyl)ZrCl$_2$ as metallocene and propylene as olefin results in a reduction in the polymerization activity from 10 kg of PP/g of metallocene×h to 63 g of PP/g of metallocene×h (0.6%) (Macromolecules, 23 (1990) 4489).

According to Adv. Organomet. Chem. 18 (1980) 99, zirconocene/trialkylaluminum systems are incapable of polymerizing propene, and are also inactive or have very low activity toward ethylene.

Smaller deactivation effects on replacement of MAO by trimethylaluminum have been observed in the Cp$_2$ZrCl$_2$/ethylene system. However, this type of system cannot polymerize prochiral olefins, such as, for example, propene, to give isotactic or syndiotactic polymers. Only atactic polymer would be formed, which is only of slight interest.

J. Polym. Sci., Part A, Pol. Chem., 29 (1991) 459 describes the polymerization of propene using rac-ethylene (1-indenyl)$_2$ZrCl$_2$ in the presence of MAO and mixtures of MAO and trimethylaluminum. Full or partial replacement of MAO by trimethylaluminum likewise results in considerable drops or loss of the polymerization activity.

SUMMARY OF THE INVENTION

The object achieved by the present invention was thus to find a catalyst system or a process for the polymerization of olefins in which the amount of cocatalyst, in particular of MAO, can be reduced with an acceptable loss of activity.

The invention relates to a catalyst system for the polymerization or copolymerization of olefins which comprises at least one metallocene as transition-metal compound and at least one aluminum compound of the formula II

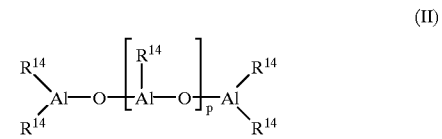

(II)

and/or of the formula (III)

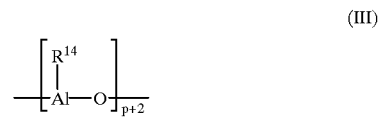

(III)

where, in the formulae (II) and (III), the radicals $R^{14}$ may be identical to or different and are a $C_1$–$C_6$-alkyl group, a $C_6$–$C_{18}$-aryl group, benzyl or hydrogen, and p is an integer from 2 to 50, and at least one aluminum compound of the formula IV

(IV)

where $R^{15}$, $R^{16}$ and $R^{17}$ are identical or different and are a hydrogen atom, a $C_1$–$C_{10}$-alkyl group, a $C_1$–$C_{15}$-alkylsilyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group, a halogen atom or a radical of the formula —OSiR$^{15}$R$^{16}$R$^{17}$ where $R^{15}$, $R^{16}$ and $R^{17}$ are as defined above.

DESCRIPTION OF THE INVENTION

The catalyst system according to the invention preferably contains a compound of the formula II and/or III in combination with a compound of the formula IV. It is furthermore preferred to employ a metallocene.

The metallocene(s) which is(are) a constituent of the catalyst system according to the invention is(are) compounds of the formula I or Ia

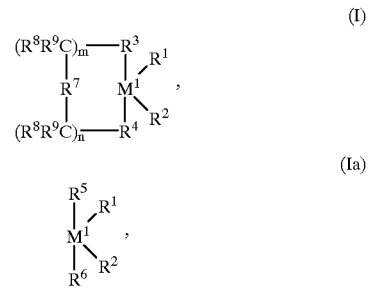

in which $M^1$ is a metal from Group IVb, Vb or VIb of the Periodic Table, $R^1$ and $R^2$ are identical or different and are a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group or a halogen atom, $R^3$ to $R^6$ are identical or different and are a monocyclic or polycyclic hydrocarbon radical which can form a sandwich structure with the central atom $M^1$, $R^7$ is

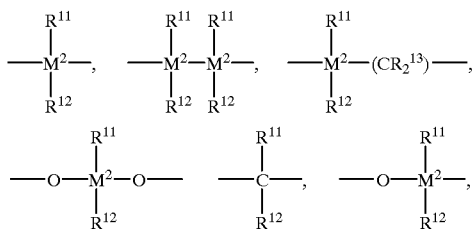

$=BR^{11}$, $=AlR^{11}$, —Ge—, —Sn—, —O—, —S—, $=SO$, $=SO_2$, $=NR^{11}$, $=CO$, $=PR^{11}$ or $=P(O)R^{11}$, where $R^{11}$, $R^{12}$ and $R^{13}$ are identical or different and are a hydrogen atom, a halogen atom, a $C_1$–$C_{10}$-alkyl group, a $C_1$–$C_{10}$-fluoroalkyl group, a $C_6$–$C_{10}$-aryl group, a $C_6$–$C_{10}$-fluoroaryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{11}$ and $R^{12}$ or $R^{11}$ and $R^{13}$, in each case with the atoms connecting them, form a ring, $M^2$ is silicon, germanium or tin, $R^8$ and $R^9$ are identical or different and are as defined for $R^{11}$, and m and n are identical or different and are zero, 1 or 2, where m plus n is zero, 1 or 2, in particular the metallocenes mentioned in the working examples.

In the Compounds I–IV, alkyl is straight-chain or branched alkyl. Halogen (halogenated) means fluorine, chlorine, bromine or iodine, preferably fluorine or chlorine.

In the formulae I and Ia, $M^1$ is a metal from Group IVb, Vb or VIb of the Periodic Table, for example titanium, zirconium, hafnium, vanadium, niobium, tantalum, chromium, molybdenum or tungsten, preferably zirconium, hafnium or titanium.

$R^1$ and $R^2$ are identical or different and are a hydrogen atom, a $C_1$–$C_{10}$-, preferably $C_1$–$C_3$-alkyl group, a $C_1$–$C_{10}$-, preferably $C_1$–$C_3$-alkoxy group, a $C_6$–$C_{10}$-, preferably $C_6$–$C_8$-aryl group, a $C_6$–$C_{10}$-, preferably $C_6$–$C_8$-aryloxy group, a $C_2$–$C_{10}$-, preferably $C_2$–$C_4$-alkenyl group, a $C_7$–$C_{40}$-, preferably $C_7$–$C_{10}$-arylalkyl group, a $C_7$–$C_{40}$-, preferably $C_7$–$C_{12}$-alkylaryl group, a $C_8$–$C_{40}$-, preferably $C_8$–$C_{12}$-arylalkenyl group or a halogen atom, preferably chlorine.

$R^3$ to $R^6$ are identical or different and are preferably cyclopentadienyl, indenyl or fluorenyl. These radicals may carry additional substituents. Examples of substituted radicals $R^3$ to $R^6$ of this type are dialkylcyclopentadienyl, trialkylcyclopentadienyl, alkylindenyl, dialkylindenyl, trialkylindenyl, alkyltetrahydroindenyl or benzo-fused indenyls.

$R^7$ is

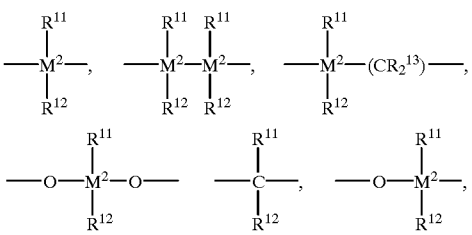

$=BR^{11}$, $=AlR^{11}$, —Ge—, —Sn—, —O—, —S—, $=SO$, $=SO_2$, $=NR^{11}$, $=CO$, $=PR^{11}$ or $=P(O)R^{11}$, where $R^{11}$, $R^{12}$ and $R^{13}$ are identical or different and are a hydrogen atom, a halogen atom, a $C_1$–$C_{10}$-, preferably $C_1$–$C_4$-alkyl group, in particular a methyl group, a $C_1$–$C_{10}$-fluoroalkyl group, preferably a $CF_3$ group, a $C_6$–$C_{10}$-, preferably $C_6$–$C_8$-aryl group, a $C_6$–$C_{10}$-fluoroaryl group, preferably a pentafluorophenyl group, a $C_1$–$C_{10}$-, preferably $C_1$–$C_4$-alkoxy group, in particular a methoxy group, a $C_2$–$C_{10}$-, preferably $C_2$–$C_4$-alkenyl group, a $C_7$–$C_{40}$-, preferably $C_7$–$C_{10}$-arylalkyl group, a $C_8$–$C_{40}$-, preferably $C_8$–$C_{12}$-arylalkenyl group or a $C_7$–$C_{40}$-, preferably $C_7$–$C_{12}$-alkylaryl group, or $R^{11}$ and $R^{12}$ or $R^{11}$ and $R^{13}$, in each case together with the atoms connecting them, form a ring.

$M^2$ is silicon, germanium or tin, preferably silicon or germanium.

$R^7$ is preferably $=CR^{11}R^{12}$, $=SiR^{11}R^{12}$, $=GeR^{11}R^{12}$, —O—, —S—, $=SO$, $=PR^{11}$ or $=P(O)R^{11}$.

$R^8$ and $R^9$ are identical or different and are as defined for $R^{11}$.

m and n are identical or different and are zero, 1 or 2, preferably zero or 1, where m plus n is zero, 1 or 2, preferably zero or 1.

The preparation of these metallocenes is known from the literature (cf., for example, Journal of Organometallic Chem. 288 (1985) 63; ditto, 369 (1989) 343; ditto, 369 (1989) 359; Chemistry Letters (1989) 1853; EP-A 387 690; EP-A 320 762).

According to the invention, cocatalysts are used together with the metallocene(s). These are representatives of two types of aluminum compound.

Type 1 are aluminoxanes of the formula (II) and/or of the formula (III), where, in the formulae (II) and (III), the radicals $R^{14}$ may be identical or different and are a $C_1$–$C_6$-alkyl group, a $C_6$–$C_{18}$-aryl group, benzyl or hydrogen, and p is an integer from 2 to 50, preferably from 10 to 35.

The radicals $R^{14}$ are preferably identical and are methyl, isobutyl, phenyl or benzyl, particularly preferably methyl.

If the radicals $R^{14}$ are different, they are preferably methyl and hydrogen or alternatively methyl and isobutyl, it being preferred for 0.01–40% (number of radicals $R^{14}$) of hydrogen or butyl to be present.

The aluminoxane can be prepared in various ways by known processes. One of the methods is, for example, to react an aluminum hydrocarbon compound and/or a hydridoaluminum hydrocarbon compound with water (in gas, solid, liquid or bonded form, for example as water of crystallization) in an inert solvent (such as, for example, toluene). To prepare an aluminoxane containing different alkyl groups $R^{14}$, two different trialkylaluminum compounds ($AlR_3$+$AlR'_3$), in accordance with the desired composition, are reacted with water (cf. S. Pasynkiewicz, Polyhedron 9 (1990) 429 and EP-A 302 424).

The precise structure of the aluminoxanes II and III is unknown.

Irrespective of the preparation method, all aluminoxane solutions have in common a varying content of unreacted aluminum starting compound, which is in free form or as an adduct.

Type 2 are aluminum compounds of the formula IV ($AlR^{15}R^{16}R^{17}$) where $R^{15}$, $R^{16}$ and $R^{17}$ are identical or different and are a hydrogen atom, a $C_1$–$C_{10}$-, preferably $C_1$–$C_8$-alkyl group, a $C_1$–$C_{15}$-, preferably $C_1$–$C_6$-alkylsilyl group, a $C_1$–$C_{10}$-, preferably $C_1$–$C_8$-alkoxy group, a $C_6$–$C_{10}$-, preferably $C_6$–$C_8$-aryl group, a $C_6$–$C_{10}$-, preferably $C_6$–$C_8$-aryloxy group, a $C_2$–$C_{10}$-, preferably $C_2$–$C_4$-alkenyl group, a $C_7$–$C_{40}$-, preferably $C_7$–$C_{10}$-arylalkyl group, a $C_7$–$C_{40}$-, preferably $C_7$–$C_{12}$-alkylaryl group, a $C_8$–$C_{40}$-, preferably $C_8$–$C_{12}$-arylalkenyl group, a halogen atom, preferably chlorine or fluorine, or a -$OSiR^{15}R^{16}R^{17}$ radical.

Particularly preferred aluminum compounds of Type 2 are trialkylaluminum, dialkylaluminum halide, alkylaluminum dihalide, dialkylaluminum hydride, dialkylaluminum-$OSiR^{15}R^{16}R^{17}$ compounds, mixed aryl/alkyl homologs of the above compounds, and mixed alkoxy/alkyl, alkoxy/aryl, aryloxy/alkyl and aryloxy/aryl homologs of the above compounds, in particular the compounds IV mentioned in the working examples.

The catalyst system according to the invention comprises, in particular, metallocene(s), cocatalyst 1 and cocatalyst 2.

Due to the combination of cocatalysts 1 and 2, it must be ensured in each case that at least one compound of the formula II and/or III (aluminoxane, Type 1) and at least one compound of the formula IV are provided for the polymerization.

It is preferred here to combine a compound of the formula II and/or III with a compound of the formula IV.

It is furthermore preferred to employ a metallocene I or Ia.

The cocatalyst 1 comprises at least one aluminum compound of Type 1 or at least one compound of Type 2. The cocatalyst 1 is used without solvent or dissolved in an inert hydrocarbon. Hydrocarbon means an aliphatic or aromatic hydrocarbon. Preference is given to toluene or benzine. The cocatalyst 1, in pure or dissolved form, is added before the polymerization reaction to the liquid monomer or the suspension medium used for the polymerization.

The amount of cocatalyst 1 is from 0.01 to 100 mmol of aluminum compound, preferably from 0.1 to 10 mmol of aluminum compound, per dm3 of polymerization medium.

The cocatalyst 2 comprises at least one aluminum compound of Type 1 and/or at least one compound of Type 2. The cocatalyst 2 is used without solvent or preferably dissolved or as a suspension in an inert hydrocarbon. An aliphatic or aromatic hydrocarbon, preferably toluene or benzine, is used.

The cocatalyst 2, in pure, suspended or dissolved form, is brought into contact with the metallocene or the metallocene mixture before the polymerization reaction. The metallocene is added either as a solid or dissolved in an inert hydrocarbon, preferably in benzine or toluene. The metallocene is preferably dissolved as a solid in the cocatalyst 2 solution or suspension. If the cocatalyst 2 is a solid, this solid can also be mixed with a solution of the metallocene or the metallocene mixture in a hydrocarbon, preferably in benzine, such as, for example, pentane, hexane or octane. The solvent can be removed and replaced by a hydrocarbon in which both the cocatalyst 2 and the metallocene or the metallocene mixture are insoluble. Alternatively, the cocatalyst 2 is applied to a support, such as, for example, silica gels, aluminum oxides, solid aluminoxane, other inorganic support materials or alternatively to a polyolefin powder in finely divided form.

The metallocene is applied to this supported cocatalyst 2 by stirring the dissolved metallocene with the supported cocatalyst 2. The solvent is removed and replaced by a hydrocarbon in which both cocatalyst 2 and the metallocene are insoluble.

The cocatalyst 2 is employed in an amount of from 0.01 to 100 mmol of aluminum compound, preferably from 0.1 to 10 mmol of aluminum compound, per $dm^3$ of polymerization medium.

The metallocene or the metallocenes is or are employed in a concentration of from $10^{-8}$ to $10^{-3}$, preferably from $10^{-7}$ to $10^{-4}$, mol per $dm^3$ of polymerization medium.

The cocatalyst 2/metallocene combination is preferably metered into the reactor which already contains the polymerization medium and the cocatalyst 1. This initiates the polymerization.

If the polymerization is carried out continuously, the polymerization medium/cocatalyst 1 and the metallocene/cocatalyst 2 are metered in continuously.

It is possible to preactivate the metallocene by means of the cocatalyst 2 before use in the polymerization reaction. This significantly increases the polymerization activity and improves the grain morphology.

The preactivation time is from 1 minute to 60 hours, preferably from 5 to 60 minutes. The preactivation is carried out at a temperature of from −78 to 100° C., preferably from 0 to 70° C.

The metallocene may also be prepolymerized. To this end, the cocatalyst 2/metallocene combination is brought into contact with an olefin, preferably the (or one of the) olefin(s) employed in the polymerization, before introduction into the polymerization system. This is carried out at temperatures of from −78 to 100° C., preferably from 0 to 70° C.

In order to remove catalyst poisons present in the olefin, purification by means of an alkylaluminum compound, for example $AlMe_3$ or $AlEt_3$, is advantageous. This purification can be carried out either in the polymerization system itself, or the olefin is brought into contact with the Al compound before introduction into the polymerization system and subsequently removed again. In the interests of the lowest possible residual ash contents in the polymer, the purification of the monomer is preferably carried out outside the polymerization system.

The polymerization or copolymerization is carried out in a known manner in solution, in suspension or in the gas phase, continuously or batchwise, in one or more steps, at a temperature of from −60 to 200° C., preferably from 30 to 80° C. Olefins of the formula $R^a$—CH═CH—$R^b$ are polymerized or copolymerized. In this formula, $R^a$ and $R^b$ are identical or different and are a hydrogen atom or an alkyl radical having 1 to 14 carbon atoms. However, $R^a$ and $R^b$, together with the carbon atoms connecting them, may also form a ring. Examples of such olefins are ethylene, propylene, 1-butene, 1-hexene, 4-methyl-1-pentene, 1-octene, norbornene or norbornadiene. In particular, propylene and ethylene are polymerized or copolymerized.

As molecular weight regulator, hydrogen is added if necessary. The overall pressure in the polymerization system is from 0.5 to 100 bar. The polymerization is preferably carried out in the pressure range of from 5 to 64 bar which is particularly interesting in industry.

The excellent hydrogen-regulation ability of the metallocenes according to the invention means that the entire molecular weight range between high-molecular-weight polyolefin and waxes can be covered by means of a single metallocene.

The present invention thus also relates to the above-described process for the polymerization or copolymerization of olefins, which comprises using the catalyst system according to the invention.

If the polymerization is carried out as a suspension or solution polymerization, an inert solvent which is customary for the Ziegler low-pressure process is used. For example, the process is carried out in an aliphatic or cycloaliphatic hydrocarbon; examples of these are propane, butane, pentane, hexane, heptane, isooctane, cyclohexane and methylcyclohexane.

It is also possible to use a benzine or hydrogenated diesel oil fraction. Toluene can also be used. The polymerization is preferably carried out in the liquid monomer. If inert solvents are used, the monomers are metered in in gas or liquid form.

The polymerization can have any desired duration since the catalyst system to be used according to the invention exhibits only a small drop in polymerization activity with time.

oligomerization of the methylaluminoxane was p=19) were then added, and the batch was stirred at 30° C. for 15 minutes. In parallel, 5.0 mg of racdimethylsilyl(1-indenyl)$_2$ ZrCl$_2$ were dissolved in 15 cm$^3$ of a toluene solution of cocatalyst 2 (cf. Table 1; mean degree of oligomerization of the methylaluminoxane was p=19) and preactivated by standing for 15 minutes. The solution was then introduced into the reactor, heated to 70° C. (10° C./min) by supply of heat, and the polymerization system was kept at 70° C. for 1 hour by means of cooling. The polymerization was terminated by addition of 20 dm$^3$ (s.t.p.) of CO$_2$ gas and removal of the excess monomer in gaseous form. The metallocene activities and viscosity numbers of the resultant polymers are shown in Table 1.

TABLE 1

| Example | Cocatalyst 1 AlMe$_3$ [mmol] | Cocatalyst 1 MAO [mmol] | Cocatalyst 2 AlMe$_3$ [mmol] | Cocatalyst 2 MAO [mmol] | Activity [kg of PP/g of metallocene × h] | Activity [g of PP/mmol of MAO] | Activity [g of PP/mol of Al] | VN [cm$^3$/g] |
|---|---|---|---|---|---|---|---|---|
| 1 | 52 | | | 20 | 293 | 74 | 20 | 52 |
| 2 | 104 | | | 20 | 267 | 67 | 11 | 49 |
| 3 | 26 | | | 20 | 339 | 85 | 37 | 52 |
| 4 | 13 | | | 20 | 296 | 74 | 45 | 51 |
| 5 | 5.2 | | | 20 | 314 | 79 | 62 | 51 |
| C1 | | 52 | | 20 | 500 | 35 | 35 | 51 |
| C2 | 52 | | 20 | | <1 | | | |
| C3 | 72 | | | | <1 | | | |
| C4 | | | 72 | | <1 | | | |
| 6 | 52 | | 20 | 20 | 355 | 89 | 19 | 50 |
| C5 | 52 | | 10 | 10 | 138 | 69 | 10 | 51 |
| 7 | 13 | | | 30 | 450 | 75 | 52 | 51 |
| C6 | 13 | 15 | | 15 | 253 | 42 | 30 | 51 |
| 8 | | 52 | 20 | | 580 | 56 | 40 | 51 |
| 9 | | 30 | | 15 | 460 | 77 | 51 | 52 |

The polymerization process according to the invention is distinguished by the fact that aluminoxane, which is expensive and difficult to prepare, can be partially replaced by cheaper aluminum compounds through a combination of two cocatalyst systems. In addition, the process according to the invention additionally makes it possible to reduce the overall amount of aluminum in the polymerization system, which results in a reduction in the residual ash contents in the polymer product.

The examples below are intended to illustrate the invention in greater detail.

The following abbreviations are used:

VN=viscosity number in cm$^3$/g,

MAO=methylaluminoxane

PP=polypropylene,

Me=methyl,

Et=ethyl,

Ph=phenyl,

Flu=fluorenyl,

Cp=cyclopentadienyl,

C=comparative example

EXAMPLES 1 to 9 AND COMPARATIVE EXAMPLES 1 to 6

A dry 24 dm$^3$ reactor was flushed with propylene and charged with 12 dm$^3$ of liquid propylene. 30 cm$^3$ of a toluene solution of cocatalyst 1 (cf. Table 1; mean degree of Examples 1 to 5 show that although replacement of MAO as cocatalyst 1 by AlMe$_3$ reduces the metallocene activity (cf. Comparative Example 1), the amount of AlMe$_3$ can simultaneously be reduced to a tenth without further loss of yield (Example 1 and Example 5). A doubling of the amount of AlMe$_3$ brings no advantages since it does not increase the activity (Example 1 and Example 2).

Replacement of all the MAO, which is not in accordance with the invention, results in virtually inactive polymerization systems (see C$_2$ to C$_4$).

Example 6 shows that additional admixing of AlMe$_3$ with cocatalyst 2 from Example 1 allows the activity to be increased. By contrast, replacement of half the MAO by cocatalyst 2 from Example 1 in Comparative Example 5 results in a halving of the metallocene activity.

An increase in the amount of MAO in the case of cocatalyst 2 in Example 7 results in a considerable increase in the metallocene activity compared with Example 4.

By contrast, distribution of the MAO over cocatalysts 1 and 2, which is described in Comparative Example 6, results in a decrease in the metallocene activity compared with Example 7.

As an alternative to Examples 1 to 7, in which MAO was replaced as cocatalyst 1 by AlMe$_3$, MAO can alternatively be replaced according to the invention in cocatalyst 2 by AlMe$_3$. This is shown in an illustrative manner by Examples 8 and 9.

EXAMPLES 10 TO 15

The procedure was as in Example 1, but AlMe$_3$ was replaced by the aluminum compounds listed in Table 2.

TABLE 2

| Example | Aluminum compound | Activity [kg of PP/g of metallocene × h] | VN of the polymer [cm$^3$/g] |
| --- | --- | --- | --- |
| 10 | diethylaluminum hydride | 35.5 | 45 |
| 11 | diethylaluminum chloride | 18.9 | 32 |
| 12 | dimethylaluminum fluoride | 5.0 | |
| 13 | ethylaluminum dichloride | 3.5 | |
| 14 | triethylaluminum | 10.1 | |
| 15 | diethylaluminum-(OSiH(Me)(Et)) | 2.5 | |

EXAMPLES 16 TO 27

The procedure was as in Example 3, but the rac-dimethylsilyl(1-indenyl)$_2$ZrCl$_2$ was replaced by the metallocenes listed in Table 3.

TABLE 3

| Ex. | Metallocene | Activity [kg of PP/g of metallocene × h] | VN of the polymer [cm$^3$/g] |
| --- | --- | --- | --- |
| 16 | 10 mg of Ph$_2$C(Flu)(Cp)-ZrCl$_2$ | 135 | 392 |
| 17 | 10 mg of Me$_2$C(Flu)(Cp)-ZrCl$_2$ | 99 | 100 |
| 18 | 5 mg of rac-Me$_2$Si(2-Me-1-indenyl)$_2$ZrCl$_2$ | 159 | 165 |
| 19 | 10 mg of rac-Me$_2$Si(2-Et-1-indenyl)$_2$ZrCl$_2$ | 102 | 145 |
| 20 | 5 mg of rac-Me$_2$Si(2-Me-4,6-i-propyl-1-indenyl)$_2$ZrCl$_2$ | 295 | 248 |
| 21 | 10 mg of rac-Me$_2$Si(2,4-dimethyl-1-Cp)$_2$ZrCl$_2$ | 205 | 45 |
| 22 | 5 mg of rac-Me$_2$Si(2-Me-4,5-benzo-1-indenyl)$_2$-ZrCl$_2$ | 272 | 274 |
| 23 | 100 mg of rac-Me$_2$Si(1-indenyl)$_2$HfCl$_2$ | 15.5 | 224 |
| 24 | 75 mg of rac-ethylene-(1-indenyl)$_2$HfCl$_2$ | 19.3 | 149 |
| 25 | 25 mg of rac-Me$_2$Si-(2,3,5-trimethyl-1-Cp)$_2$-ZrCl$_2$ | 60 | 55 |
| 26 | 50 mg of rac-Me$_2$C(1-indenyl)$_2$ZrCl$_2$ | 24.3 | 14 |
| 27 | 5 mg of rac-Me$_2$Ge(1-indenyl)$_2$ZrCl$_2$ | 394 | 59 |

EXAMPLE 28

The procedure was as in Example 18, but in addition 50 g of ethylene gas were metered in at a uniform rate during the polymerization. The metallocene activity was 164 kg of copolymer/g of metallocene×h, and the VN of the polymer was 194 cm$^3$/g. The random copolymer contained 5.6% of ethylene.

EXAMPLE 29

The procedure was as in Example 18, but 250 g of ethylene were added after a polymerization time of 30 minutes. The metallocene activity was 219 kg of copolymer/g of metallocene×h, and the VN of the polymer was 234 cm$^3$/g. The block copolymer contained 19.5% of ethylene.

EXAMPLE 30

The procedure was as in Example 18, but 48 dm$^3$ (s.t.p.) of hydrogen were metered into the reactor before the propylene was added. The metallocene activity was 173 kg of PP/g of metallocene×h, and the VN of the polypropylene wax was 18 cm$^3$/g.

EXAMPLE 31

A dry 24 dm$^3$ reactor was flushed with nitrogen and charged with 12 dm$^3$ of a benzine cut having the boiling range 100–120° C. from which the aromatics had been removed. The gas space of the reactor was then flushed free from nitrogen by injecting 2 bar of ethylene and releasing the pressure, and repeating this cycle 4 times. 15 mmol of trimethylaluminum in 30 cm$^3$ of toluene were then added, the reactor was heated to 60° C. over the course of 15 minutes with stirring, and the overall pressure was adjusted to 5 bar by addition of ethylene. In parallel, 5 mg of rac-ethylene(2-methyl-1-indenyl)$_2$zirconium dichloride were dissolved in 20 cm$^3$ of a toluene solution of methylaluminoxane (30 mmol of MAO, mean degree of oligomerization p=14), left to stand for 15 minutes and introduced into the reactor. The polymerization was carried out for 1 hour at 70° C., the pressure in the system being kept at 5 bar by topping up with ethylene. 395 g of polyethylene were obtained. The VN of the polyethylene was 305 cm$^3$/g.

EXAMPLE 32

The procedure was as in Example 18, but the toluene solution of methylaluminoxane was replaced by the same amount and molarity of an isobutylmethylaluminoxane solution in heptane. The metallocene activity was 137.5 kg of PP/g of metallocene×h, and the polymer had a VN of 159 cm$^3$/g. Isobutylmethylaluminoxane was obtained by reacting a mixture of isobutylAlMe$_2$ and AlMe$_3$ with water in heptane and contained 9 mol % of isobutyl units and 91 mol % of methyl units.

EXAMPLE 33

Example 18 was repeated, but the toluene solution of methylaluminoxane was replaced by the same amount and molarity of a hydridomethylaluminoxane solution (prepared from Me$_2$AlH and water in toluene). The metallocene activity was 119 kg of PP/g of metallocene×h, and the polymer had a VN of 160 cm$^3$/g.

EXAMPLE 34

The procedure was as in Example 3, but the cocatalyst 1 solution used was 34.5 ml of a triisobutylaluminum solution in heptane (26 mmol of Al). The reaction was terminated by rapidly removing the excess monomer in gaseous form. It was not possible to terminate the polymerization using CO$_2$ when triisobutylaluminum was used as cocatalyst due to the unpleasant smelling reaction products which form. If desired, however, the reaction can alternatively be terminated, for example, using an alcohol. 1.27 kg of polypropylene were obtained, corresponding to a metallocene activity of 254 kg of PP/g of metallocene×h. Based on the amount of methylaluminoxane employed, the activity was 63.5 g of PP/mmol of MAO, and based on the total amount of aluminum in cocatalyst 1 and cocatalyst 2, the activity was 27.6 g of PP/mmol of Al. The VN of the polymer was 62 cm$^3$/g.

EXAMPLE 35

The procedure was as in Example 8, but the cocatalyst 2 was 20 mmol of triisobutylaluminum (18.3 ml of a toluene solution). The polymerization was terminated using 50 ml of ethanol. 2.41 kg of polypropylene were obtained, corresponding to 480 kg of PP/g of metallocene×h, 46 g of PP/mmol of MAO or 33.5 g of PP/mmol of total aluminum. The VN of the polymer was 51 cm$^3$/g.

EXAMPLE 36

The procedure was as in Example 35, but the metallocene used was 10 mg of rac-Me$_2$Si(2-Me-1-indenyl)$_2$ZrCl$_2$. The polymerization temperature was 50° C., and the polymerization was terminated by rapidly removing the excess monomer in the gaseous form. 2.51 kg of polypropylene were obtained, corresponding to 251 kg of PP/g of metallocene×h. The VN of the polymer was 265 cm$^3$/g.

EXAMPLE 37

The procedure was as in Example 34, but the metallocene used was 5 mg of rac-Me$_2$Si(2-Me-1-indenyl)$_2$ZrCl$_2$. The polymerization temperature was 50° C., and the polymerization was terminated by rapidly removing the excess monomer in gaseous form. 1.37 kg of polypropylene were obtained, corresponding to 274 kg of PP/g of metallocene×h. The VN of the polymer was 269 cm$^3$/g.

EXAMPLE 38

The procedure was as in Example 35, but the metallocene used was 8.2 mg of rac-phenyl(methyl)silyl(2-Me-4,6-diisopropyl-1-indenyl)$_2$ZrCl$_2$, the polymerization temperature was 50° C., and the polymerization was terminated by rapidly removing the excess monomer in gaseous form. 3.12 kg of polypropylene were obtained, corresponding to 380 kg of PP/g of metallocene×h. The VN of the polymer was 573 cm$^3$g, and the molecular weight, determined by gel permeation chromatography (GPC), was M$_w$=777 000 g/mol.

COMPARATIVE EXAMPLE 7

The procedure was as in Example 38, but triisobutylaluminum was replaced by the same molar amount of methylaluminoxane. The VN of the polymer was 478 cm$^3$/g, and M$_w$ was 566 000 g/mol.

We claim:

1. A catalyst system for the polymerization or copolymerization of olefins which consists essentially of the combination of at least one metallocene as transition-metal compound with two different aluminum cocatalysts said cocatalysts being a cocatalyst 1 and a supported cocatalyst 2, where the cocatalyst 1 comprises at least one compound of the formula II and/or of the formula III or at least one compound of the formula IV, and the cocatalyst 2 comprises at least one compound of the formula II and/or of the formula III and/or at least one compound of the formula IV,

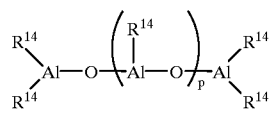
(II)

and/or the formula (III)

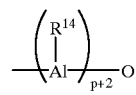
(III)

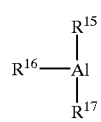
(IV)

where the radicals R$^{14}$ are identical or different and are a C$_1$–C$_8$-alkyl group, a C$_6$–C$_{18}$-aryl group, benzyl or hydrogen, and p is an integer from 2 to 50, R$^{15}$, R$^{16}$ and R$^{17}$ are identical or different and are a hydrogen atom, a C$_1$–C$_{10}$-alkyl group, a C$_1$–C$_{15}$-alkylsilyl group, C$_1$–C$_{10}$ alkoxy group, a C$_6$–C$_{10}$-aryl group, C$_6$–C$_{10}$ aryloxy group, a C$_2$–C$_{10}$-alkenyl group, a C$_7$–C$_{40}$-arylalkyl group, a C$_7$–C$_{40}$-alkylaryl group, a C$_8$–C$_{40}$-arylalkenyl group, a halogen atom, or a radical of the formula —OSiR$^{25}$R$^{26}$R$^{27}$ wherein R$^{25}$, R$^{26}$ and R$^{27}$ are identical or different and are a hydrogen atom, a C$_1$–C$_{10}$-alkyl group, a C$_1$–C$_{15}$-alkylsilyl group, C$_1$–C$_{10}$ alkoxy group, a C$_6$–C$_{10}$-aryl group, C$_6$–C$_{10}$ aryloxy group, a C$_2$–C$_{10}$-alkenyl group, a C$_7$–C$_{40}$-arylalkyl group, a C$_7$–C$_{40}$-alkylaryl group, a C$_8$–C$_{40}$-arylalkenyl group or a halogen atom, and said cocatalyst 2 is applied to a support to form a supported cocatalyst 2 and said metallocene is dissolved with said supported cocatalyst 2 to form a supported cocatalyst 2 metallocene mixture and then said cocatalyst 2/metallocene mixture is added to said cocatalyst 1 and with the proviso that said catalysts 1 or said cocatalyst 2 must contain at least one aluminum compound of the formula IV and the other cocatalyst must contain at least the compound of the formula II or formula III.

2. A catalyst system as claimed in claim 1, wherein the compound of the formula IV is trialkylaluminum, dialkylaluminum halide, alkylaluminum dihalide or dialkylaluminum hydride.

3. A catalyst system as claimed in claim 1, wherein the compound of the formula IV is trimethylaluminum, diethylaluminum hydride, diethylaluminum chloride, dimethylaluminum fluoride, ethylaluminum dichloride or triethylaluminum.

4. A catalyst system as claimed in claim 1, wherein the halogen atom is fluorine or chlorine.

5. A catalyst system as claimed in claim 1, wherein p is an integer from 10 to 35.

6. A catalyst system as claimed in claim 3, wherein p is an integer from 10 to 35.

7. A catalyst system as claimed in claim 1, wherein R$^{14}$ is methyl, isobutyl, phenyl or benzyl.

8. A catalyst system as claimed in claim 6, wherein R$^{14}$ is methyl, isobutyl, phenyl or benzyl.

9. A catalyst system as claimed in claim 8, wherein R$^{14}$ is methyl.

10. A catalyst system as claimed in claim 1, wherein the radicals R$^{14}$ are different, and they are methyl and hydrogen or methyl and isobutyl.

11. A catalyst system as claimed in claim 6, wherein the radicals R$^{14}$ are different, and they are methyl and hydrogen or methyl and isobutyl.

12. A catalyst system as claimed in claim 11, wherein $R^{15}$, $R^{16}$ and $R^{17}$ are identical or different and are a hydrogen atom, a $C_1$–$C_8$-alkyl group, a $C_1$–$C_6$-alkylsilyl group, a $C_6$–$C_8$-aryl group, a $C_2$–$C_4$-alkenyl group, a $C_7$–$C_{10}$-arylalkyl group, a $C_7$–$C_{12}$-alkylaryl group, a $C_8$–$C_{12}$-arylalkenyl group, chlorine or fluorine.

13. A catalyst system as claimed in claim 6, wherein $R^{15}$, $R^{16}$ and $R^{17}$ are identical or different and are a hydrogen atom, a $C_1$–$C_8$-alkyl group, a $C_1$–$C_6$-alkylsilyl group, a $C_6$–$C_8$-aryl group, a $C_2$–$C_4$-alkenyl group, a $C_7$–$C_{10}$-arylalkyl group, a $C_7$–$C_{12}$-alkylaryl group, a $C_8$–$C_{12}$-arylalkenyl group, chlorine or fluorine.

14. A supported catalyst system for the polymerization or copolymerization of olefins which consists essentially of the combination of at least one zirconocene as transition-metal compound with at least one aluminum compound of the formula (II)

(II)

and/or of the formula (III)

(III)

where, in the formulae (II) and (III), the radicals $R^{14}$ may be identical or different and are a $C_1$–$C_8$-alkyl group, a $C_6$–$C_{18}$-aryl group, benzyl or hydrogen, and p is an integer from 10 to 50, and at least one aluminum compound of the formula (IV)

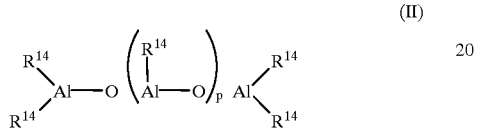

(IV)

where $R^{15}$, $R^{16}$ and $R^{17}$ are identical or different and are a hydrogen atom, a $C_1$–$C_{10}$-alkyl group, a $C_1$–$C_{15}$-alkylsilyl group, a $C_1$–$C_{10}$ alkoxy group, a $C_7$–$C_{10}$ aryloxy group, a $C_6$–$C_{10}$-aryl group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group, a halogen atom or a radical of the formula —$OSiR^{25}R^{26}R^{27}$ wherein $R^{25}$, $R^{26}$ and $R^{27}$ are identical or different and are a hydrogen atom, a $C_1$–$C_{10}$-alkyl group, a $C_1$–$C_{15}$-alkylsilyl group, $C_1$–$C_{10}$ alkoxy group, a $C_6$–$C_{10}$-aryl group, $C_6$–$C_{10}$ aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group or a halogen atom, and said catalyst is applied to a support.

15. The catalyst system as claimed in claim 14, wherein the compound of formula IV is triisobutylaluminum.

16. The catalyst system as claimed in claim 14, wherein said support is selected from the group consisting of silica gels, solid aluminoxane, inorganic support materials or a polyolefin powder in finely divided form.

17. A catalyst system for the polymerization or copolymerization of olefins which comprises the combination which consists essentially of at least one metallocene as transition-metal compound with two different aluminum cocatalysts said cocatalysts being a cocatalyst 1 and a cocatalyst 2, where
the cocatalyst 1 comprises at least one compound of the formula II and/or of the formula III or at least one compound of the formula IV, and
the cocatalyst 2 comprises at least one compound of the formula II and/or of the formula III and/or at least one compound of the formula IV,

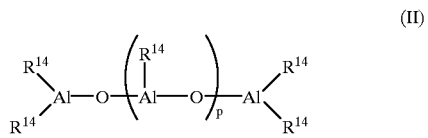

(II)

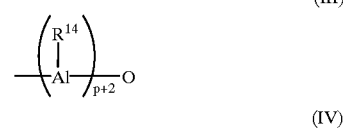

(III)

(IV)

where
the radicals $R^{14}$ may be identical or different and are a $C_1$–$C_8$-alkyl group, a $C_6$–$C_{18}$-aryl group, benzyl or hydrogen, and p is an integer from 2 to 50,
$R^{15}$, $R^{16}$ and $R^{17}$ are identical or different and are a hydrogen atom, a $C_1$–$C_{10}$-alkyl group, a $C_1$–$C_{15}$-alkylsilyl group, $C_1$–$C_{10}$ alkoxy group, a $C_6$–$C_{10}$-aryl group, $C_6$–$C_{10}$ aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group a halogen atom, or a radical of the formula —$OSiR^{25}R^{26}R^{27}$ wherein $R^{25}$, $R^{26}$ and $R^{27}$ are identical or different and are a hydrogen atom, a $C_1$–$C_{10}$-alkyl group, a $C_1$–$C_{15}$-alkylsilyl group, $C_1$–$C_{10}$ alkoxy group, a $C_6$–$C_{10}$-aryl group, $C_6$–$C_{10}$ aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group or a halogen atom,
wherein said metallocene is a compound of the formula (I) or (Ia)

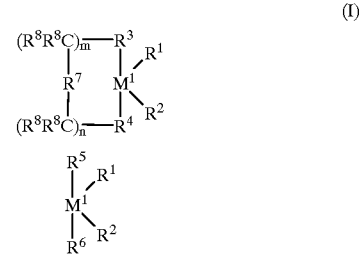

(I)

in which
$M^1$ is a metal from Group IVb, Vb or VIb of the Periodic Table,
$R^1$ and $R^2$ are identical or different and are a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group or a halogen atom, $R^3$ to $R^6$ are identical or different and are a monocyclic or polycyclic hydrocarbon radical which can form a sandwich structure with the central atom $M^1$, $R^7$ is

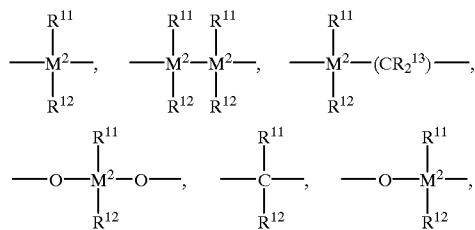

$=BR^{11}$, $=AlR^{11}$, $—Ge—$, $—Sn—$, $—O—$, $—S—$, $=SO$, $=SO_2$, $=NR^{11}$, $=CO$, $=PR^{11}$ or $=P(O)R^{11}$, where $R^{11}$, $R^{12}$ and $R^{13}$ are identical or different and are a hydrogen atom, a halogen atom, a $C_1$–$C_{10}$-alkyl group, a $C_1$–$C_{10}$-fluoroalkyl group, a $C_6$–$C_{10}$-aryl group, a $C_6$–$C_{10}$-fluoroaryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{11}$ and $R^{12}$ or $R^{11}$ and $R^{13}$, in each case with the atoms connecting them, form a ring, $M^2$ is silicon, germanium or tin, $R^8$ and $R^9$ are identical or different and are as defined for $R^{11}$, and m and n are identical or different and are zero, 1 or 2, where m plus n is zero, 1 or 2, and wherein said cocatalyst 2 is applied to a support to form a supported cocatalyst 2 and said metallocene is dissolved with said supported cocatalyst 2 to form a supported cocatalyst 2 metallocene mixture and then said cocatalyst 2/metallocene mixture is added to said cocatalyst 1 and with the proviso that said cocatalyst 1 or said cocatalyst 2 must contain at least one aluminum compound of the formula IV and the other cocatalyst must contain at least the compound of the formula II or formula III.

18. The catalyst system as claimed in claim 17, wherein said metallocene is dimethylsilyl(1-indenyl)$_2$ZrCl$_2$.

19. The catalyst system as claimed in claim 17, wherein said support is silica gels, aluminum oxides or solid aluminoxane said cocatalyst is employed in an amount of from 0.01 to 100 mol of aluminum compound per dm$^3$ of polymerization medium.

* * * * *